United States Patent [19]

Onodera

[11] 4,247,868
[45] Jan. 27, 1981

[54] PRE-AMPLIFIERS FOR COLOR TELEVISION CAMERAS

[75] Inventor: Hideo Onodera, Kodaira, Japan

[73] Assignee: Hitachi Denshi Kabushiki Kaisha, Tokyo, Japan

[21] Appl. No.: 22,204

[22] Filed: Mar. 19, 1979

[30] Foreign Application Priority Data

Mar. 20, 1978 [JP] Japan .................................. 53-32178

[51] Int. Cl.³ ............................................... H04N 9/08
[52] U.S. Cl. ..................................................... 358/29
[58] Field of Search ........................ 358/29, 44, 27, 28

[56] References Cited

U.S. PATENT DOCUMENTS 3,786,177  1/1974  Bazin ....................................... 358/29
4,064,529  12/1977 Seer, Jr. .................................. 358/29

FOREIGN PATENT DOCUMENTS 50-65123  6/1975  Japan ......................................... 358/29

Primary Examiner—Howard W. Britton
Assistant Examiner—Michael Allen Masinick
Attorney, Agent, or Firm—Charles E. Pfund

[57] ABSTRACT

In a pre-amplifier for use in a three electrode single tube type color television type, color signals delivered from respective electrodes are processed by output signal processing circuits. Each output signal processing circuit comprises a high input impedance amplifier provided with a feedback circuit. A variable resistor is connected in the feedback circuit for adjusting the gain of the amplifier.

4 Claims, 3 Drawing Figures

F I G. 1
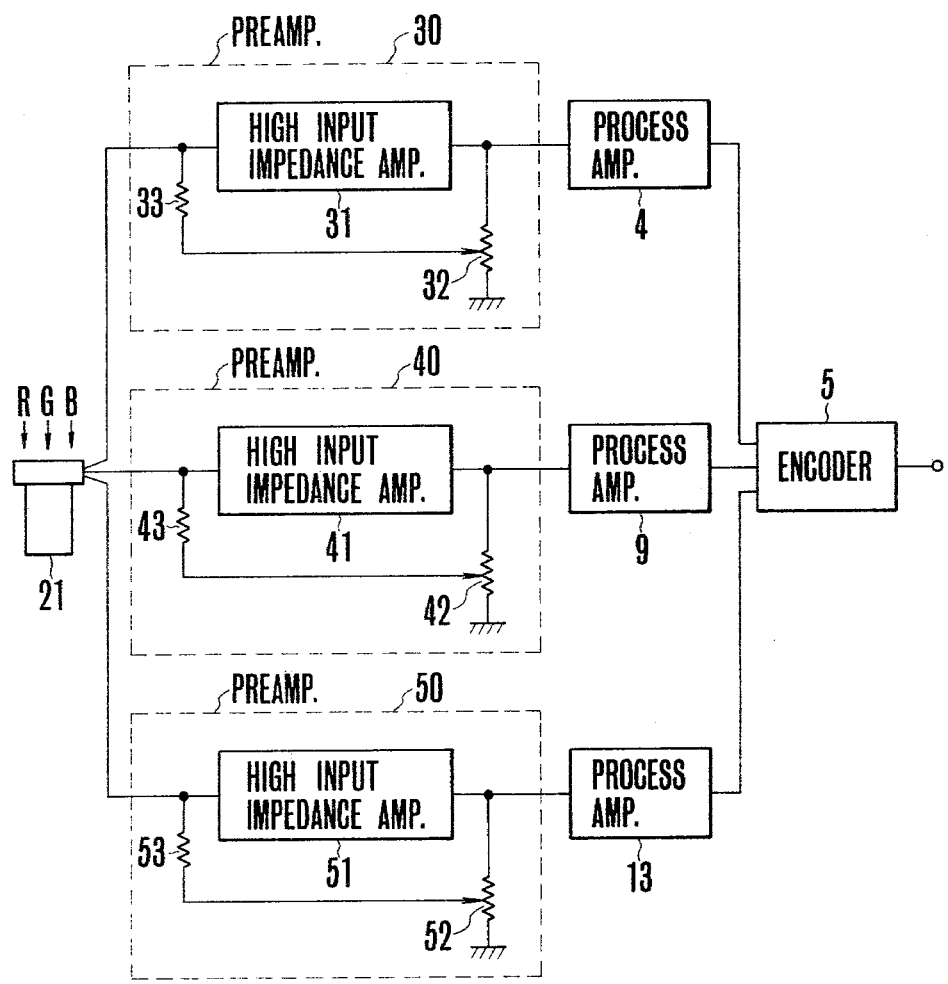

PRE-AMPLIFIERS FOR COLOR TELEVISION CAMERAS

BACKGROUND OF THE INVENTION

This invention relates to a pre-amplifier for use in a three electrode single tube type color television camera capable of adjusting the gain of the amplifier without causing any cross talk.

Color television cameras are classified into a three tube type camera utilizing three image pick-up tubes for red, green and blue colors, and a three electrode single tube type camera in which three signal electrodes for red, green and blue colors contained in a single tube are divided into stripes and a plurality of sets of the stripes are arranged alternately.

According to one example of a circuit for processing the output signal of a three tube type color television camera, a red signal produced by a red image pick-up tube is amplified by a pre-amplifier, adjusted its gain with an attenuator and then applied to a process amplifier. A green signal generated by a green pick-up tube and a blue signal produced by a blue pick-up tube are also applied to a respective process amplifiers through respective pre-amplifiers and attenuators. The electric signals shaped by respective process amplifiers are applied to a common encoder to be converted into NTSC color television signals.

Since, owing to the variation in color temperatures, the ratio of electric signals produced by respective image pick-up tubes is not 1:1:1, the gains are adjusted by associated attenuators such that when a white object is picked up, the ratio of input signals of respective process amplifiers would be 1:1:1.

However, when this circuit is used for a three electrode single tube type color television camera, there is a problem of causing cross talks.

More particularly, in an equivalent circuit of a three electrode single tube type image pick-up tube for use in a color television camera, the red color signal generated by a current source of the image pick-up tube for red color, the green color signal generated by a current source for green color and the blue color signal generated by a current source for blue color flow through associated load resistors equivalently representing the signal processing circuit. However, there are electrostatic capacitances between three electrodes of the single tube type camera. This is equivalent to connecting capacitors between the electrodes. When the terminal voltages across respective load resistors are not equal, currents corresponding to the voltage differences flow to the circuits of different colors through the capacitors, thus causing cross talks. Let us denote the signal current from the source for red color by $I_R$, the signal current from the source for green color by $I_G$ and the signal current from the source for blue color by $I_B$. Further, let us denote the resistance values of respective load resistors by $R_R$, $Z_G$ and $Z_B$. The condition necessary to prevent cross talk is expressed by the following equation.

$$I_R \cdot Z_R = I_G \cdot Z_G = I_B \cdot Z_B$$

In other words, in order to prevent cross talk, it is necessary to adjust the input impedance of the pre-amplifier of the output signal processing circuit such that the input impedance is inversely proportional to signal currents from respective current sources.

One example of the solution to this problem is disclosed in Japanese Patent Application Laid-Open No. 65123/1975.

According to this solution, however, for the purpose of effecting white balance while at the same time preventing cross talk, it is necessary to adjust the output level of the pre-amplifier concurrently with the adjustment of its input impedance. Such adjustments are complicated and not practical.

SUMMARY OF THE INVENTION

It is therefore an object of this invention to provide a pre-amplifier of a color television camera capable of adjusting the gain in such a manner as to effect the white balance without causing any cross talk.

According to this invention, there is provided a pre-amplifier for use in a three electrode single tube type color television camera of the type wherein color signals delivered from respective electrodes are processed by output signal processing circuits, characterized in that each processing circuit comprises a high input impedance amplifier for amplifying a color signal produced by an image pick-up tube of the television camera a feedback circuit connected between the input and output of the high input impedance amplifier, and means connected in the feedback circuit for varying the amount of feedback to adjust the gain of the amplifier.

BRIEF DESCRIPTION OF THE DRAWINGS

In the accompanying drawings:

FIG. 1 is a basic block diagram showing a three electrode single tube type color television camera utilizing one embodiment of the pre-amplifier of this invention;

DESCRIPTION OF THE PREFERRED EMBODIMENTS

Figure 2:
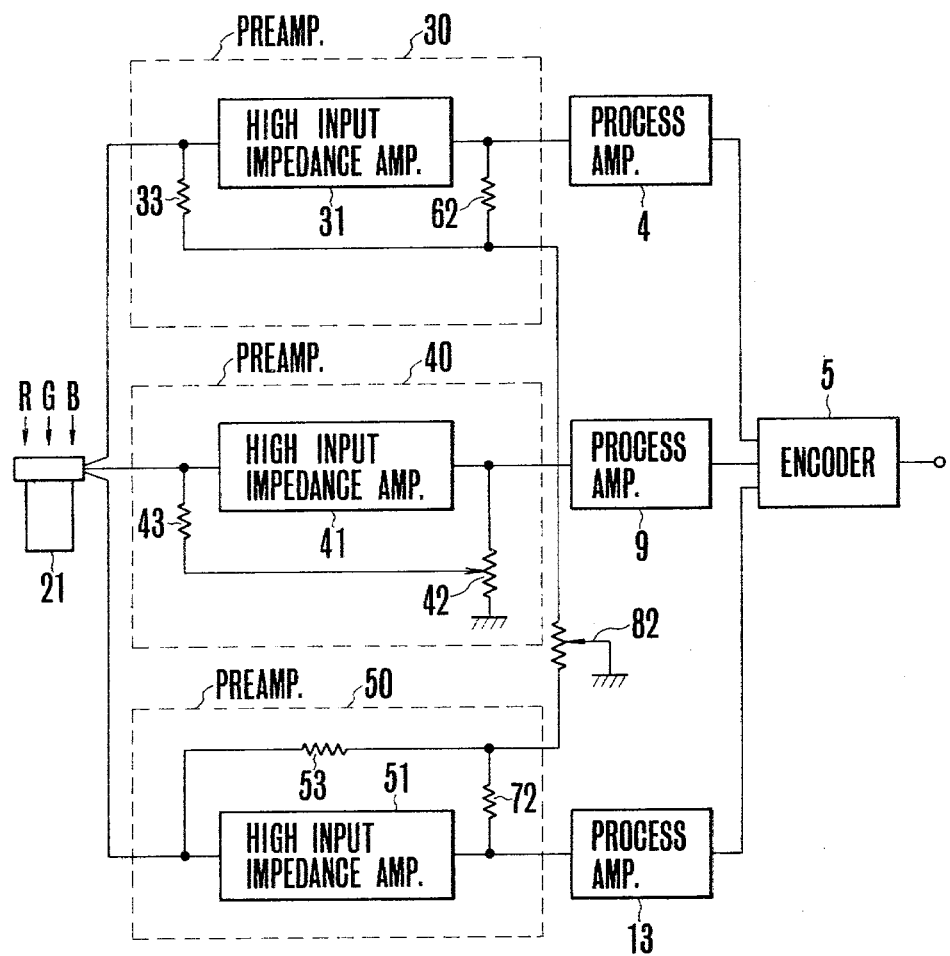
FIG. 2 is a block diagram showing a modified embodiment of this invention.

Referring now to FIG. 1 of the accompanying drawing, a red color signal produced by an image pick-up tube 21 is amplified by a pre-amplifier 30 and then applied to a process amplifier 4. In the same manner, a green color signal and a blue color signal generated by the image pick-up tube 21 are amplified by pre-amplifiers 40 and 50 and then applied to process amplifiers 9 and 13, respectively. Electric signals shaped by respective process amplifiers 4, 9 and 13 are applied to a common encoder 5 to be converted into NTSC color television signals. The pre-amplifier 30 of the red color signal circuit comprises a high input impedance amplifier 31, an attenuator 32 connected to the output thereof, and an input resistor 33 connected between the attenuator 32 of the input of the amplifier 31. The attenuator 32 and the input resistor 33 constitute a feedback circuit connected in parallel with the high input impedance amplifier 31.

Where $G_n$ denotes the gain of the amplifier 31, $R_i$ the value of the input resistor 33, $\beta$ the amount of attenuation of the attenuator 32, $Z_R$ the equivalent input impedance of the pre-amplifier 30, and $V_R$ the output voltage thereof, the following equations hold.

$$Z_R = \frac{R_i}{G_n \cdot \beta} \text{ (where } G_n \cdot \beta \gg 1\text{)} \quad (1)$$

$$V_R = \frac{I_R R_i}{\beta} \quad (2)$$

From equations (1) and (2)

$$I_R \cdot Z_R = V_R / G_n \quad (3)$$

Also the pre-amplifiers 40 and 50 are constituted by high input impedance amplifiers 41 and 51, attenuators 42 and 52 and input resistors 43 and 53, respectively. Accordingly, in the pre-amplifiers 40 and 50, too, the following equations hold.

$$I_G \cdot Z_G = V_G / G_n \quad (4)$$

$$I_B \cdot Z_B = V_B / G_n \quad (5)$$

When picking up a white object, the attenuators 32, 42 and 52 are adjusted to make equal the output voltages $V_R$ $V_G$ and $V_B$ of respective pre-amplifiers for the purpose of effecting white balance. Since high input impedance amplifiers 31, 41 and 51 of respective pre-amplifiers are identical, their gains $G_n$ are equal. Accordingly, equations (3), (4) and (5) are all equal regardless of the resistance values of input resistors 33, 43 and 53 and the amounts of attenuations of the attenuators 32, 42 and 52, thus $$I_R \cdot Z_R = I_G \cdot Z_G = I_B \cdot Z_B \quad (6)$$

Equation (6) satisfies the condition that the input impedance is inversely proportional to the signal currents from respective current sources.

Thus, when the white balance is obtained by adjusting the amounts of attenuations of respective attenuators such that the ratio of the levels of the input signals to the process amplifiers 4, 9 and 13, that is, the output voltages of the pre-amplifiers 30, 40 and 50 will be 1:1:1, cross talk can be automatically prevented.

It is necessary to adjust the white balance when the color temperature of the light illuminating the object varies. To this end, it is sufficient to vary the blue color component and the red color component relative to such other in the opposite directions.

Based on this characteristic, the white balance can be attained by using a single knob that adjusts the gains of the blue color signal and the red color signal.

Figure 3:
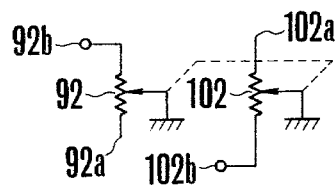
FIG. 3 is a partial connection diagram showing a modification of the embodiment shown in FIG. 2.

FIG. 2 shows a modification of this invention based on this principle. Thus, a variable resistor 82 is commonly used for the red signal pre-amplifier 30 and the blue signal pre-amplifier 50 for differentially varying the gains for these two signals. In FIG. 2 reference numerals 62 and 72 designate load resistors. Instead of using a single variable resistor, two interlocked variable resistors 92 and 102 respectively associated with the pre-amplifiers for red and blue color signals may be used as shown in FIG. 3. The variable resistor 92 shown in FIG. 3 has one end 92a connected to a junction between the resistors 33 and 62 and the other end 92b which is open; and the variable resistor 102 has one end 102a connected to a junction between the resistors 53 and 72 and the other end 102b which is open. The variable resistors 92 and 102 are interlocked such that their resistance values are varied in the opposite directions.

As described above, according to the pre-amplifiers of this invention for a color television camera of the three electrode single tube type, an easy adjustment of the pre-amplifier gain for effecting white balance can be ensured by merely adding a simple circuit, without causing any cross talk.

What is claimed is:

1. In a pre-amplifier for use in a three electrode single tube type color television camera wherein color signals delivered from respective electrodes are processed by output signal processing circuits, the improvements wherein each processing circuit comprises a high input impedance amplifier for amplifying a color signal produced by the image pick-up tube of said television camera, a feedback circuit connected between the input and output of said high input impedance amplifier, and means connected in said feedback circuit for varying the amount of feedback to adjust the gain of said amplifier, said feedback varying means comprising variable resistance means for varying the gains for respective color signals.

2. A pre-amplifier according to claim 1 which further comprises variable resistance means for varying the gains for a blue color signal and a red color signal in the opposite directions.

3. A pre-amplifier according to claim 1 wherein said variable resistance means comprises a variable resistor connected between the feedback circuits of the high input impedance amplifiers of red and blue color signals.

4. A pre-amplifier according to claim 1 wherein said variable resistance means comprises a pair of interlocked variable resistors respectively connected to the feedback circuits of the high input impedance amplifiers of red and blue color signals.

* * * * *